12,930,733
Patented Mar. 29, 1960

2,930,733
CONTROL OF HOG ASCARID INFECTIONS WITH NICARBAZIN

Gerald Brody, Quincy, Ill., assignor to Moorman Manufacturing Company, Quincy, Ill., a corporation of Illinois No Drawing. Application December 23, 1957
Serial No. 704,338

2 Claims. (Cl. 167—53)

This invention relates to the treatment or prevention of hog ascarid infections by retarding or preventing the production of hog ascarid ova eggs by female worms and preventing development of such ova as may be passed in the droppings.

It has been found that when nicarbazin is fed to swine continuously at a level from as low as 0.0025% to 0.01% based on the weight of the ration, the production of hog ascarid ova by female worms will be substantially reduced or entirely prevented, and the development of such ova as may be passed in the droppings will also be substantially retarded or entirely prevented. The continuous low level use of nicarbazin will thus prevent contamination of pastures and buildings by breaking the life cycle of the worms.

Nicarbazin is a complex of 4,4'-dimnitrocarbanilide and 2-hydroxy-4,6, dimethylpyrimidine. This compound and one method of producing it were described in Science, August 5, 1955, vol. 122, No. 3162, pages 244–255. It was more recently disclosed as a coccidiostat in Patent 2,731,382, dated January 17, 1956. Nicarbazin is currently marketed for use in chicken feeds as a coccidiostat. In view of the anti-coccidial activity of nicarbazine, it was investigated as an anthelmintic in both chickens and swine (Federation Proceedings, vol. 15, No. 1, March 1956). In these experiments, swine fed 0.1% nicarbazin were free from *Ascaris lumbricoides* (large round worms), although healed lesions characteristic of larval ascaris migrations were found in the liver and lungs. The present invention is not concerned with the use of nicarbazin either as a coccidiostat or anthelmintic, but with a new and entirely different use and result.

It was discovered in accordance with the present invention that when nicarbazin is administered in the low levels of from 0.0025% to 0.01%, based on the weight of the ration, it effectively reduced the production of hog ascarid ova and also prevented development of such ova as might be passed without any untoward effects on the animals. This concentration is not sufficient to permit the nicarbazin to serve as an anthelmintic for expelling worms. The ability of nicarbazin to prevent production of ascarid ova in swine appears to be peculiar to these animals since it is not effective with chick ascarids when fed in such low levels. The following are among the advantages of low level use of nicarbazin to control and prevent hog ascarid infections: (1) the treatment is inexpensive; (2) it is non-injurious to the animal and does not interfere with normal gain in body weight or exhibit any other untoward effect; (3) the treatment is easy and convenient in that the nicarbazin is incorporated in the ration; (4) the treatment affords continuous protection; and (5) it prevents the development of the ascarid ova and thus attacks the cause of the infection at the source rather than serving as a conventional anthelmintic to expel worms from an animal after development therein.

Furthermore, the nicarbazin in the low level is effective not only in the animal but also prevents development of the ova in the droppings.

Accordingly, the object of the invention, generally stated, is an improved composition and method of treatment for controlling or preventing hog ascarid infections and more particularly such a composition method wherein unusually low levels of an active ingredient, i.e. nicarbazin, serve to prevent or reduce the production of hog ascarid ova by female worms and prevent the development of such ova as may be passed in the droppings.

Certain other objects of the invention will, in part, be obvious and will, in part, appear hereinafter.

For a more complete understanding of the nature and the scope of the invention, reference may now be had to the following example and tables.

A preferred level of feeding the nicarbazin to swine is approximately 0.005% to 0.007% based on the ration or daily food intake. However, as little as 0.0025% nicarbazin will be partially effective and up to 0.01% may be administered without untoward effects.

The following example will serve to illustrate pig feed containing 0.005% by weight of nicarbazin.

EXAMPLE

*Complete pig ration—weaning to 75 or 100 lb.*

|  | Percent |
|---|---|
| Ground grains (corn, oats, barley, grain sorghum, etc.) | 80.0 |
| Soybean oil meal | 10.0 |
| Fish meal | 3.0 |
| Meat scraps | 3.0 |
| Alfalfa meal | 2.0 |
| Limestone | 0.5 |
| Bone meal or dicalcium phosphate | 0.5 |
| Salt with trace minerals—iodine, zinc, iron, copper, manganese | 0.5 |
| Vitamin-antibiotic premix supplying vitamin D, vitamin A, riboflavin, niacin, pantothenic acid and Aureomycin | 0.5 |
| Nicarbazin [1] | 0.005 |
|  | 100.005 |

[1] Must be premixed with a portion (at least 1%) of the complete ration to obtain adequate distribution.

The three following tables contain data obtained from numerous experiments with swine to show the value and behavior of nicarbazin at low levels for control of hog ascarid infections. The data in Table 1 bring out that nicarbazin is highly effective against ascarid ova although it is not highly efficient as a conventional anthelmintic for deworming. Table 2 brings out the efficacy of low level nicarbazin on hog ascarid, the viability of passed ova and the viable eggs per gram of feces (EPG). In Table 3 further data are presented to indicate efficacy of nicarbazin fed at low levels (0.005%) to pigs averaging 55 to 60 pounds in weight.

TABLE 1

*Anthelmintic efficacy of nicarbazin at low-level against hog ascarids*

| Pig No. | Nicarbazin Intake | | | Length of Medication (in days) | Body Weight (in lbs.) | Worm EPG | | Anthelmintic Efficacy | | |
|---|---|---|---|---|---|---|---|---|---|---|
| | Percent in Feed | Mg./kg./day | G./day | | | Before | After | Total Worm Infection | No. Worms Expelled | Percent Efficiency |
| 116-5 | 0.01 | 6.8 | 0.22 | 21 | 72 | 8,100 | 0 | 50 | 34 | 68 |
| 113-5 | 0.01 | 6.9 | 0.25 | 10 | 80 | 7,100 | 200 | 13 | 6 | 46 |
| 116-10 | 0.01 | 7.2 | 0.14 | 21 | 44 | 5,000 | 400 | 73 | 4 | 6 |
| 116-9 | 0.0075 | 6.2 | 0.12 | 21 | 43 | 2,900 | 300 | 16 | 2 | 13 |
| 116-12 | 0.005 | 3.6 | 0.05 | 21 | 33 | 3,200 | 200 | 30 | 0 | 0 |
| 116-7 | 0.005 | 3.6 | 0.13 | 21 | 88 | 1,500 | 100 | 20 | 1 | 5 |
| 113-10 | 0 | | | 10 | 85 | 3,100 | 5,800 | 49 | 7 | 14 |
| 116-2 | 0 | | | 21 | 47 | 2,200 | 2,700 | | 1 | |
| 116-8 | 0 | | | 21 | 68 | 7,800 | 2,400 | | 1 | |
| 116-11 | 0 | | | 21 | 24 | 10,900 | 15,500 | | 0 | |

TABLE 2

*Effect of low level nicarbazin (0.001%–0.0075%) on hog ascarid EPG, viability of passed ova and viable EPG*

A. HOG ASCARID EPG [1]

| Pig Number | Percent Nicarbazin | Weeks on Medication | | | | | | | | |
|---|---|---|---|---|---|---|---|---|---|---|
| | | 0 | 0.5 | 1.0 | 1.5 | 2.0 | 2.5 | 3.0 | 3.5 | 4.0 |
| 116-9 | 0.0075 | 2,900 | 3,200 | 2,500 | 300 | 300 | | 300 | | |
| 116-7 | 0.005 | 1,500 | 1,700 | 100 | 600 | 500 | | 100 | | |
| 116-12 | 0.005 | 3,200 | 3,700 | 6,800 | 2,200 | 0 | | 0 | | |
| 116-3 | 0.001 | 4,500 | 8,100 | 7,100 | 2,300 | 4,300 | | 6,000 | | |
| 116-8 | 0 | 7,800 | 9,000 | 11,400 | 2,800 | 900 | | 2,400 | | |
| 116-2 | 0 | 2,200 | 4,100 | 1,300 | 4,700 | 1,900 | | 2,700 | | |
| 116-11 | 0 | 10,900 | 9,100 | 9,100 | 12,100 | 20,800 | | 15,500 | | |
| 117-4 | 0.00625 | 1,800 | 500 | 400 | 0 | 100 | 500 | 200 | 0 | 0 |
| 117-3 | 0.005 | 6,000 | 1,400 | 800 | 200 | 400 | 200 | 200 | 400 | 300 |
| 117-2 | 0.00375 | 2,700 | 1,200 | 1,900 | 1,400 | 1,400 | 800 | 200 | 500 | 100 |
| 117-1 | 0.0025 | 1,400 | 1,600 | 2,300 | 5,700 | 1,500 | 900 | 300 | 0 | 200 |
| 117-5 | 0 | 2,000 | 2,400 | 5,600 | Dead | | | | | |
| 117-11 | 0 | 15,500 | 13,700 | 12,100 | 19,500 | 7,400 | 9,200 | 4,200 | 6,800 | 7,200 |

B. PERCENT EMBRYONATION [2]

| Pig Number | Percent Nicarbazin | 0 | 0.5 | 1.0 | 1.5 | 2.0 | 2.5 | 3.0 | 3.5 | 4.0 |
|---|---|---|---|---|---|---|---|---|---|---|
| 116-9 | 0.0075 | 100 | 56 | 60 | 28 | 48 | | 25 | | |
| 116-7 | 0.005 | 100 | 16 | 20 | 20 | 28 | | 4 | | |
| 116-12 | 0.005 | 100 | 100 | 28 | 92 | | | 60 | | |
| 116-3 | 0.001 | 100 | 100 | 100 | 84 | 100 | | 32 | | |
| 116-8 | 0 | 100 | 100 | 100 | 100 | 100 | | 100 | | |
| 116-2 | 0 | 100 | 100 | 100 | 100 | 100 | | 100 | | |
| 116-11 | 0 | 100 | 100 | 100 | 100 | 100 | | 100 | | |
| 117-4 | 0.00625 | 100 | 36 | 0 | 0 | 0 | 0 | | | |
| 117-3 | 0.005 | 100 | 24 | 0 | 0 | 17 | | | | |
| 117-2 | 0.00375 | 100 | 16 | 92 | 36 | 76 | 76 | | | |
| 117-1 | 0.0025 | 100 | 64 | 60 | 0 | 12 | 27 | | | |
| 117-5 | 0 | 100 | 96 | 100 | Dead | | | | | |
| 117-11 | 0 | 100 | 100 | 100 | 84 | 82 | 100 | | | |

C. VIABLE EPG [3]

| Pig Number | Percent Nicarbazin | 0 | 0.5 | 1.0 | 1.5 | 2.0 | 2.5 | 3.0 | 3.5 | 4.0 |
|---|---|---|---|---|---|---|---|---|---|---|
| 116-9 | 0.0075 | 2,900 | 1,790 | 1,500 | 80 | 140 | | 30 | | |
| 116-7 | 0.005 | 1,500 | 270 | 20 | 120 | 140 | | 10 | | |
| 116-12 | 0.005 | 3,200 | 3,700 | 1,900 | 2,020 | 2 | | 120 | | |
| 116-3 | 0.001 | 4,500 | 8,100 | 7,100 | 1,930 | 4,300 | | 1,920 | | |
| 116-8 | 0 | 7,800 | 9,000 | 11,400 | 2,800 | 900 | | 2,400 | | |
| 116-2 | 0 | 2,200 | 4,100 | 1,300 | 4,700 | 1,900 | | 2,700 | | |
| 116-11 | 0 | 10,900 | 9,100 | 9,100 | 12,100 | 20,800 | | 15,500 | | |
| 117-4 | 0.00625 | 1,800 | 180 | 0 | 0 | 0 | 0 | | | |
| 117-3 | 0.005 | 6,000 | 240 | 0 | 0 | 70 | | | | |
| 117-2 | 0.00375 | 2,700 | 190 | 1,750 | 500 | 1,060 | 610 | | | |
| 117-1 | 0.0025 | 1,400 | 1,020 | 1,380 | 0 | 180 | 240 | | | |
| 117-5 | 0 | 2,000 | 2,300 | 5,600 | Dead | | | | | |
| 117-11 | 0 | 15,500 | 13,700 | 12,100 | 16,380 | 6,070 | 9,200 | | | |

[1] Eggs per gram feces.
[2] Ova cultured for 14 days to ascertain percent embryonation.
[3] Viable EPG is calculated as follows: EPG × percent hatchability.

TABLE 3

*Efficacy of 0.005% nicarbazin against hog ascarid infections*

[Lab. Hog Ascarid Exp. 118]

A. HOG ASCARID EPG

| Ration | No. Pigs | Weeks on Medication | | | | |
|---|---|---|---|---|---|---|
| | | −1 | 0 | 1 | 2 | 3 |
| No medication | 3 | 3,770 | 5,570 | 9,000 | 2,130 | 2,570 |
| 0.005% Nicarbazin | 3 | 5,430 | 7,730 | 2,900 | 170 | 170 |

B. PERCENT EMBRYONATION OF OVA

| | | | | | | |
|---|---|---|---|---|---|---|
| No medication | | | 100 | 99 | 91 | 100 |
| 0.005% Nicarbazin | | | 100 | 16 | 3 | 15 |

C. VIABLE EPG

| | | | | | | |
|---|---|---|---|---|---|---|
| No medication | | | 5,570 | 8,910 | 1,938 | 2,570 |
| 0.005% Nicarbazin | | | 7,730 | 464 | 5 | 26 |

In view of the foregoing disclosure, those skilled in the art will be able to practice the invention as disclosed or in one or more suitable and obvious manners.

What is claimed as new is:

1. The method of controlling hog ascarid infections which comprises continuously feeding swine with a ration containing from about 0.0025% to 0.01% by weight of nicarbazin.

2. The method of controlling hog ascarid infections which comprises continuously feeding swine with a ration containing from about 0.005% to 0.007% by weight of nicarbazin.

References Cited in the file of this patent

UNITED STATES PATENTS 2,731,382  Basso _____ Jan. 17, 1956

OTHER REFERENCES

Cuckler: Fed. Proc., March 1956, pp. 414, 415.

UNITED STATES PATENT OFFICE

CERTIFICATE OF CORRECTION

Patent No. 2,930,733                          March 29, 1960

Gerald Brody

It is hereby certified that error appears in the printed specification of the above numbered patent requiring correction and that the said Letters Patent should read as corrected below.

Columns 3 and 4, Table 2 (C), fifth column thereof under the heading "Weeks on Medication", third line, opposite Pig Number "116-12", for the numeral "2" read -- 0 --.

Signed and sealed this 13th day of September 1960.

(SEAL)
Attest:

KARL H. AXLINE                                        ROBERT C. WATSON

Attesting Officer                                     Commissioner of Patents